United States Patent [19]
Mitate et al.

[11] Patent Number: 5,702,843
[45] Date of Patent: Dec. 30, 1997

[54] NONAQUEOUS SECONDARY BATTERY

[75] Inventors: Takehito Mitate; Motoaki Nishijima, both of Nara-ken, Japan

[73] Assignee: Sharp Kabushiki Kaisha, Japan

[21] Appl. No.: 640,137

[22] Filed: Apr. 30, 1996

[30]   Foreign Application Priority Data

May 24, 1995 [JP] Japan ................................ 7-125176
Apr. 9, 1996 [JP] Japan ................................ 8-086649

[51] Int. Cl.[6] ............................................. H01M 4/58
[52] U.S. Cl. ........................ 429/218; 429/221; 429/224
[58] Field of Search ............................. 429/218, 221, 429/224

[56]   References Cited

U.S. PATENT DOCUMENTS 5,135,732  8/1992  Barboux et al. ............... 429/224 X
5,496,664  3/1996  Sterr ................................. 429/224

FOREIGN PATENT DOCUMENTS

0646977 A2   4/1995  European Pat. Off. .
HEI 7-78609  3/1995  Japan .

OTHER PUBLICATIONS

Chemical Abstracts, vol. 122, No. 6, 6 Feb. 1995, Columbus, Ohio, US; abstract No. 60090, Nishijima: "Li deintercalation and structural change in the lithium transition metal nitride Li3FeN2", XP002012381 & J. Solid State Chemistry, vol. 113, No. 1, 1994, pp. 205–210.

Chemical Abstracts, vol. 124, No. 16, 15 Apr. 1996, Columbus, Ohio, US, abstract No. 207215, Takada Kazunori et al: "Electrochemical Devices with Improved Electrodes", XP002012382 & JP-A-07 320720 (Matsushita).

Patent Abstracts of Japan, vol. 0 (E-000) & JP-A-08 078018 (Sanyo Electric Co., Ltd.) Mar. 1996.

*Primary Examiner*—Stephen Kalafut
*Attorney, Agent, or Firm*—Nixon & Vanderhye

[57]   ABSTRACT

A nonaqueous secondary battery is provided which comprises a positive electrode, a negative electrode and a nonaqueous ion conductor, either one of the positive electrode and the negative electrode containing lithium or a lithium absorbable and desorbable substance as an active material thereof, the other electrode containing a lithium transition-metal nitride of an anti-fluorite type structure as an active material thereof.

8 Claims, 8 Drawing Sheets

● Example
◆ Comparative Example

*Fig. 8*

*Fig. 9*

NONAQUEOUS SECONDARY BATTERY

BACKGROUND OF THE INVENTION

1. Field of the Invention

The present invention relates to a nonaqueous secondary battery. More particularly, the invention relates to a nonaqueous secondary battery comprising a positive electrode, a negative electrode and a nonaqueous ion conductor, wherein either one of the positive electrode and the negative electrode contains a lithium transition-metal nitride as an active material thereof.

2. Related Arts

With the downsizing and energy saving of electronic systems and the like, a voltage required for driving an electronic component such as an IC has been reduced from 5V to 3V and further to below 3V. In addition, the electronic systems have been increasingly provided with a cordless function. For this reason, small-size and light-weight secondary batteries having a high energy density are desired so that such an electronic system can be driven with a voltage applied by a driving source of a single battery.

Presently available secondary batteries adapted to generate a voltage of higher than 3V include a lithium ion secondary battery (average voltage: 3.6V) utilizing lithium cobaltate as a positive-electrode active material and a carbon material which can be doped and dedoped with lithium ions as a negative-electrode active material. Further, there is proposed a lithium secondary battery utilizing metal lithium or a lithium alloy as a negative electrode thereof and vanadium pentoxide, titanium disulfide, tungsten trioxide or manganese dioxide as a positive-electrode active material.

However, the lithium ion secondary battery generates a relatively high voltage of 3.6V, though an electronic component such as an IC requires a lower driving voltage. The secondary battery serving as a power source causes a large energy loss. For this reason, it is desirable to reduce the battery voltage of the lithium ion secondary battery.

In order to reduce the battery voltage, it is necessary to use a positive-electrode active material having a lower potential than lithium cobaltate. Examples of specific positive-electrode active materials include manganese dioxide, vanadium pentoxide, titanium sulfide and molybdenum sulfide. Immediately after a battery is fabricated using such a positive-electrode active material, the positive-electrode active material is in a charged state and, therefore, a discharge process should come first. The lithium ion secondary battery utilizes as a negative-electrode active material a carbon or graphite material or the like which can be doped or dedoped with lithium ions. Immediately after the battery is fabricated using such a negative-electrode active material, the negative-electrode active material is in a discharged state and, therefore, a charge process should come first. Where the aforesaid positive-electrode active material and negative-electrode active material are used in combination for the fabrication of a secondary battery, the resulting secondary battery does not operate.

To cause the secondary battery using manganese dioxide, vanadium pentoxide, titanium sulfide or molybdenum sulfide as the positive-electrode active material to properly operate, a material initially containing lithium should be used as the negative-electrode active material. Examples of such a lithium-containing substance include metal lithium and lithium alloys.

However, a lithium secondary battery using metal lithium or a lithium alloy as a negative electrode thereof suffers from the following problems.

Where lithium metal is used alone as the negative electrode of the battery, dendrite (branching tree-like crystal) is generated on lithium metal during a repeated charge-discharge cycle, i.e., during a lithium dissolution-deposition process. The dendrite grows to penetrate through a separator of the battery and contacts the positive electrode, resulting in a short circuit among the negative and positive elctrode. Further, the generation of the dendrite prevents deposited lithium from being fully used for the charge-discharge process, thereby deteriorating the cycle characteristics of the negative electrode.

Where a lithium alloy is used instead of lithium metal, the generation of the dendrite is suppressed in comparison with the case where lithium metal is used alone as the negative electrode, and the charge-discharge cycle characteristics are improved. Even with use of the lithium alloy, however, the generation of the dendrite cannot be completely prevented, resulting in a short circuit within the secondary battery.

As described above, it is desirable to reduce the battery voltage of a secondary battery which is to be used in an electronic system requiring a reduced driving voltage. Further, there is a need for a safe secondary battery which employs a positive-electrode active material such as manganese dioxide, vanadium pentoxide, titanium sulfide or molybdenum sulfide which is initially in a charged state, and is free from an internal short circuit.

SUMMARY OF THE INVENTION

The present invention provides a nonaqueous secondary battery comprising a positive electrode, a negative electrode and a nonaqueous ion conductor, either one of the positive electrode and the negative electrode containing lithium or a lithium-absorbable and desorbable material as an active material thereof, the other electrode containing a lithium transition-metal nitride of an anti-fluorite type structure as an active material thereof.

DESCRIPTION OF THE PREFERRED EMBODIMENTS

The lithium transition-metal nitride having the anti-fluorite type structure according to the present invention can be used as an active material of either the positive electrode or the negative electrode. The lithium transition-metal nitride is represented, for example, by a composition formula $Li_xMN_y$ wherein M is a transition metal such as Ti, V, Cr, Mn, Fe, Nb, Ta, Mo or W, $1 \leq x \leq 7.6$ and $2 \leq y \leq 4$. Where the transition metal is manganese, the lithium transition-metal nitride is represented by $Li_xMnN_4$ ($5 \leq x \leq 7.6$) immediately after the preparation thereof, and has a lithium-defect structure, a stoichiometrical structure or a lithium-excess structure. Where the transition metal is iron, the lithium transitionmetal nitride is represented by $Li_xFeN_2$ ($2.5 \leq x \leq 3.8$) immediately after the preparation thereof, and has a lithium defect structure, a stoichiometrical structure or a lithium excess structure. Examples of specific lithium transitionmetal nitrides having a stoichiometrical structure include $Li_5TiN_3$, $Li_7VN_4$, $Li_{15}Cr_2N_9$, $Li_6CrN_4$, $Li_7MnN_4$, $Li_3FeN_2$, $Li_7NbN_4$, $Li_7TaN_4$, $Li_6MoN_4$ and $Li_6WN_4$.

When lithium is inserted into or removed from the lithium transition-metal nitride during the charge-discharge process, the composition ratio of lithium in the active material changes.

Figure 1:
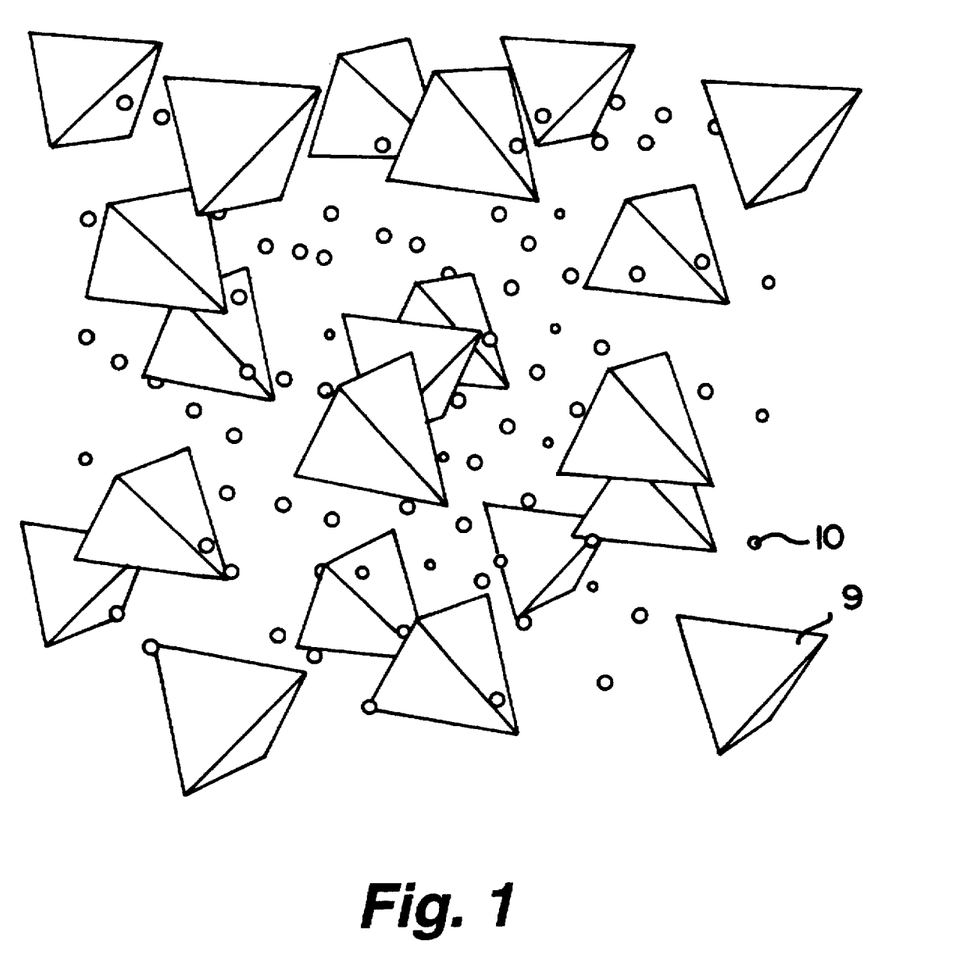
FIG. 1 is a schematic diagram illustrating a crystal structure of a lithium transition-metal nitride.
Figure 2:
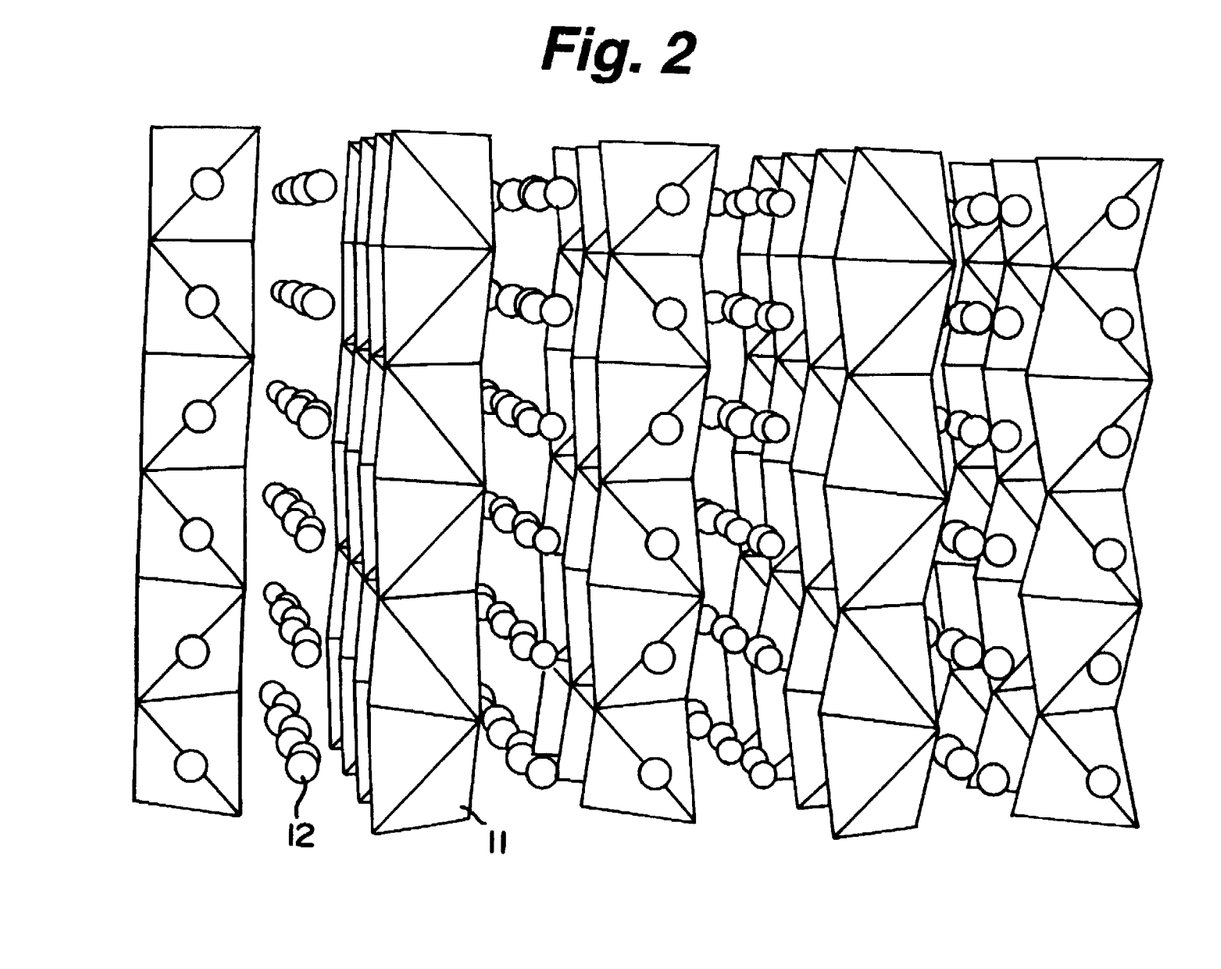
FIG. 2 is a schematic diagram illustrating a crystal structure of another lithium transition-metal nitride.

FIG. 1 is a schematic diagram illustrating an anti-fluorite type crystal structure of $Li_7VN_4$, $Li_7MnN_4$, $Li_7NbN_4$ or $Li_7TaN_4$. FIG. 2 is a schematic diagram illustrating an anti-fluorite type crystal structure of $Li_3FeN_2$. $Li_5CrN_4$, $Li_{15}Cr_2N_9$, $Li_6MoN_4$ and $Li_6WN_4$ have substantially the same crystalline structure as shown in FIG. 1 but are lithium deficient. Referring to FIGS. 1 and 2, transition metal atoms are located at four coordination positions and lithium atoms are also located at four coordination positions. In FIG. 1, nitrogen atoms are located in a distorted cubic closest-packed arrangement and the transition metal atoms occupy the tetrahedral site forming an anionic three-dimensional network. Reference numeral 10 denotes lithium atoms. In FIG. 2, nitrogen atoms are located in a distorted cubic close packed arrangement and the transition metal atoms occupy the tetrahedral site, in which tetrahedral neighboring edges with each other form one-dimensional chains. Reference numeral 12 denotes lithium atoms.

The lithium transition-metal nitride is prepared, for example, in the following manner. Usable as a lithium material is lithium nitride. Usable as a transition metal material is a transition metal or a nitride thereof. The transition metal material is mixed with an excess amount of lithium nitride. The amount of the lithium nitride depends on the composition of a lithium transition-metal nitride to be prepared. The mixture thus obtained is calcinated at a temperature of 400° C. to 1,300° C. in a nitrogen atmosphere containing a few-percent hydrogen for the preparation of the lithium transition-metal nitride. Alternatively, the mixture may be first press-molded and then calcinated.

When the lithium transition-metal nitride thus prepared is used as the active material of an electrode, the electrode is formed of a mixture containing the lithium transition-metal nitride, a conductive material, a binder, an optional solid electrolyte and the like.

Examples of specific conductive materials include carbon materials such as carbon black, acetylene black and Ketchen black, graphite particles (e.g., natural graphite and artificial graphite), metal powder and metal fiber, but not limited thereto.

Examples of specific binders include fluoropolymers such as polytetrafluoroethylene and polyvinylidene fluoride, polyolefin polymers such as polyethylene, polypropylene and ethylene-propylene-diene terpolymer, and styrene-butadiene rubber, but not limited thereto.

The solid electrolyte to be optionally blended is not particularly limited, but may be any of inorganic and organic materials known to be used for an electrode.

Usable as the inorganic solid electrolyte are a nitride, halides and oxyacid salts of lithium. Examples thereof include $Li_3N$, LiI, $Li_3N$-LiI-LiOH, $LiSiO_4$, $LiSiO_4$-LiI-LiOH, $Li_3PO_4$-$Li_4SiO_4$, phosphorus sulfide compounds and $Li_2SiS_3$.

Examples of the organic solid electrolytes include polyethylene oxide derivatives, polymers containing polyethylene oxide derivatives, polypropylene oxide derivatives, polymers containing polypropylene oxide derivatives and phosphoric ester polymers.

The mixing ratio is preferably 1 to 50 parts by weight of the conductive material and 1 to 30 parts by weight of the binder with respect to 100 parts by weight of the active material. If the proportion of the conductive material is less than 1 part by weight, a practical secondary battery cannot be fabricated, because the resistance or polarization of the resulting electrode is increased resulting in a decreased charge and discharge capacity. If the proportion of the conductive material is greater than 50 parts by weight (which may vary depending on the kind of a conductive material to be blended), the charge and discharge capacity of the resulting electrode is undesirably reduced, because the relative content of the active material in the electrode is reduced. If the proportion of the binder is less than 1 part by weight, the binding ability is lost. If the proportion of the binder is greater than 30 parts by weight, the relative content of the active material in the resulting electrode is reduced, like the case of the conductive material. Further, the resistance or polarization of the electrode is increased as described above, so that the charge and discharge capacity thereof is undesirably reduced. This makes the electrode impractical.

For the preparation of the electrode, the aforesaid mixture is press-molded into a pellet. Alternatively, the aforesaid mixture is mixed with an appropriate solvent, and the resulting paste is applied on a collector, then dried and pressed into a sheet form. The preparation method for the electrode is not limited to these methods.

As described above, the collector may be used to facilitate the transfer of electrons to/from the electrode. A material for the collector is not particularly limited, but the collector may be formed of a mono-element metal, an alloy, a carbon material or the like. Examples of specific materials for the collector include titanium, iron, nickel, copper, aluminum, stainless steel, and copper, aluminum and stainless steel materials coated with carbon, nickel, titanium, silver or the like, and those materials surface-treated for oxidation. The collector may be in a foil form, a film form, a sheet form, a mesh form, a punched form, a lath form, a porous form or a foamed form, or in a form of fiber compact. The thickness of the collector is not particularly limited, but may be 1 μm to 1 mm.

Where the electrode containing the lithium transition-metal nitride as an active material thereof is used as the positive electrode, an electrode containing lithium or a lithium-absorbable and desorbable material is used as the negative electrode. Examples of the lithium-absorbable and desorbable material include lithium alloys such as a lithium aluminum alloy, a lithium-tin alloy, a lithium-lead alloy and Wood's alloy. However, lithium and lithium alloys may produce dendrite and, therefore, the use of the following active materials is more preferable. Other examples of the lithium-absorbable and desorbable active material include conductive polymers (polyacetylene, polythiophene, polyparaphenylene and the like), pyrolyzed carbon materials, carbon materials pyrolyzed in a gas phase in the presence of a catalyst, carbon materials resulting from calcination of pitch, coke, tar and the like, and carbon materials resulting from the calcination of polymers such as cellulose, phenol and the like. These materials can be electrochemically doped and dedoped with lithium ions. Further examples thereof include graphite materials (e.g., natural graphite, artificial graphite, expanded graphite and the like) which can intercalate and deintercalate lithium ions, and inorganic compounds (e.g., $WO_2$, $MoO_2$ and the like) which can be doped and dedoped with lithium ions. These active materials may be used alone or in combination.

Among the aforesaid negative-electrode active materials, the pyrolyzed carbon materials, the carbon materials pyrolyzed in a gas phase in the presence of a catalyst, the carbon materials resulting from the calcination of pitch, coke, tar and the like, the carbon materials resulting from the calcination of polymers and graphite materials (natural graphite, artificial graphite, expanded graphite and the like) are particularly preferred because the resulting secondary battery is excellent in battery characteristics and safety.

Where the conductive polymers, carbon materials, graphite materials, inorganic compounds and the like are used as the negative-electrode active material, a conductive material and a binder may be added thereto.

Examples of specific conductive materials include carbon materials such as carbon black, acetylene black and Ketchen black, graphite particles (e.g., natural graphite, artificial graphite and the like), metal powder and metal fiber, but not limited thereto.

Examples of specific binders include fluoropolymers such as polytetrafluoroethylene and polyvinylidene fluoride, polyolefin polymers such as polyethylene, polypropylene and ethylene-propylene-diene terpolymer, and styrene-butadiene rubber, but not limited thereto.

Where the electrode containing the lithium transition-metal nitride as an active material thereof is used as the negative electrode, an electrode containing a lithium-absorbable and desorbable active material is used as the positive electrode. Usable as a positive electrode active material are lithium-insertable and desertable chalcogen compounds. Examples thereof include such chalcogen compounds as lithium-containing oxides such as $LiCoO_2$, $LiNiO_2$, $LiFeO_2$, $LiMnO_2$ and $LiVO_2$, manganese oxide, titanium oxide, vanadium oxide, tungsten oxide, molybdenum oxide, niobium oxide, chromium oxide, titanium sulfide, molybdenum sulfide, niobium sulfide, vanadium sulfide, titanium selenide and molybdemun selenide.

The negative electrode containing the lithium transition-metal nitride as the active material thereof initially retains lithium and, therefore, the positive electrode is first subjected to a discharge process. The positive-electrode active material is preferably a lithium-insertable active material, i.e., an active material which does not contain lithium initially. Therefore, chalcogen compounds such as manganese oxide, titanium oxide, vanadium oxide, tungsten oxide, molybdenum oxide, niobium oxide, chromium oxide, titanium sulfide, molybdenum sulfide, niobium sulfide, vanadium sulfide, titanium selenide and molybdenum selenide are preferably used as the positive-electrode active material. Further, a lithium-containing manganese compound having a composition ratio Li/Mn of less than ½ can serve as a lithium-insertable positive-electrode active material. Among the chalcogen compounds described above, $MnO_2$, $V_2O_5$, $V_6O_{13}$, $TiO_2$, $WO_3$, $MoO_3$, $Nb_2O_5$, $VO_2$, $CrO_2$, $Cr_3O_8$, $TiS_2$, $MoS_2$, $MoS_3$ and lithium-containing manganese oxide are particularly preferred as the positive-electrode active material.

When any of the aforesaid compounds is used as the positive-electrode active material, the positive electrode is formed of a mixture containing the active material, a conductive material, a binder, an optional solid electrolyte and the like.

Examples of specific conductive materials include carbon materials such as carbon black, acetylene black and Ketchen black, graphite particles (e.g., natural graphite, artificial graphite and the like), metal powder and metal fiber, but not limited thereto.

Examples of specific binders include fluoropolymers such as polytetrafluoroethylene and polyvinylidene fluoride, polyolefin polymers such as polyethylene, polypropylene and ethylene-propylene-diene terpolymer, and styrene-butadiene rubber, but not limited thereto.

The mixing ratio is preferably 1 to 50 parts by weight of the conductive material and 1 to 30 parts by weight of the binder with respect to 100 parts by weight of the active material. If the proportion of the conductive material is less than 1 part by weight, a practical secondary battery cannot be fabricated, because the resistance or polarization of the resulting electrode is increased resulting in a decreased charge and discharge capacity. If the proportion of the conductive material is greater than 50 parts by weight (which may vary depending on the kind of a conductive material to be blended), the charge and discharge capacity of the resulting electrode is undesirably reduced, because the relative content of the active material in the electrode is reduced. If the proportion of the binder is less than 1 part by weight, the binding ability is lost. If the proportion of the binder is greater than 30 parts by weight, the relative content of the active material in the resulting electrode is reduced, like the case of the conductive material. Further, the resistance or polarization of the electrode is increased as described above, so that the charge and discharge capacity thereof is undesirably reduced. This makes the electrode impractical.

Usable as the ion conductor for the secondary battery are organic electrolytic solutions, solid electrolytes (e.g., polymer solid electrolyte and inorganic solid electrolytes), molten salts and the like. Among these, organic electrolytic solutions are particularly preferred.

The organic electrolytic solution comprises an organic solvent and an electrolyte.

The organic solvent is not particularly limited, but may be a non-protic organic solvent. Examples thereof include such esters as propylene carbonate, ethylene carbonate, butylene carbonate, diethyl carbonate, dimethyl carbonate, methyl ethyl carbonate, γ-butyrolactone, methyl formate and methyl acetate, tetrahydrofuran and substituted tetrahydrofurans such as 2-methyltetrahydrofuran, such ethers as dioxolane, diethyl ether, dimethoxyethane, diethoxyethane and methoxyethoxyethane, dimethylsulfoxide, sulfolane, methylsulfolane and acetonitrile. These organic solvents may be used either alone or as a mixture.

Examples of specific electrolytes include such lithium salts as lithium perchlorate, lithium borofluoride, lithium phosphofluoride, arsenic lithium hexafluoride, lithium trifluoromethane sulfonate, lithium halides and lithium chloroaluminate, but not limited thereto. These electrolytes may be used either alone or as a mixture.

The organic electrolytic solution can be prepared by dissolving the electrolyte in any of the aforesaid solvents.

Known as an inorganic solid electrolyte are a nitride, halides and oxyacid salts of lithium. Examples thereof include $Li_3N$, $LiI$, $Li_3N$-$LiI$-$LiOH$, $LiSiO_4$, $LiSiO_4$-$LiI$-$LiOH$, $Li_3PO_4$-$Li_4SiO_4$, phosphorus sulfide compounds and $Li_2SiS_3$.

Usable as the organic solid electrolyte are a substance comprising any of the aforesaid electrolytes and a polymer permitting the dissociation of the electrolyte, and a substance comprising a polymer having an ionization group. Examples of the polymer permitting the dissociation of the electrolyte include polyethylene oxide derivatives, polymers containing polyethylene oxide derivatives, polypropylene oxide derivatives, polymers containing polypropylene oxide derivatives and phosphoric ester polymers. Also usable are a polymer matrix material containing any of the aforesaid non-protic polar solvents, a mixture of a polymer having an ionization group and a non-protic polar electrolytic solution and an electrolytic solution containing polyacrylonitrile. The inorganic and organic solid electrolytes may be used in combination.

A separator is used to retain the ion conductor. Exemplary materials of the separator include nonwoven fabrics and woven fabrics of electrically-insulating synthetic resin fibers, glass fibers and natural fibers, microporous materials and compacts of alumina powder and the like. Among these, nonwoven fabrics of synthetic resin fibers such as of polyethylene and polypropylene are particularly preferred in terms of the stability of the battery. A separator made of a nonwoven fabric of any of such synthetic resin fibers or a microporous material may be adapted to isolate the positive electrode and the negative electrode from each other when the battery is abnormally heated to cause the separator to be fused. From the viewpoint of safety, the separator of this type is preferably used.

The thickness of the separator is not particularly limited as long as the separator can retain a required amount of ion conductor and prevent a short-circuit between the positive electrode and the negative electrode, but may be typically about 0.01 mm to about 1 mm, preferably about 0.02 mm to about 0.05 mm.

The present invention can be applied to any secondary battery in a coin shape, a button shape, a sheet form, a cylindrical shape, a square shape or the like.

A coin- or button-shaped battery can be fabricated in a usual manner. More specifically, the positive electrode and the negative electrode each formed into a pellet form are put in a case, and the electrolyte solution is poured in the case, and then a cover is pressedly secured to the case with an insulation packing interposed therebetween.

A cylindrical or square battery can also be fabricated in a usual manner. Specifically, a sheet electrode is put in a case and electrically connected to the case, and the electrolyte solution is poured in the case. Then, the case is sealed with a sealing body with an insulation packing interposed therebetween or with the sealing body insulated from the case by a hermetic sealing. A safety valve including a safety device may be used as the sealing body. Exemplary safety devices include a fuse, a bimetal and a PTC (positive temperature coefficient) device which functions as an overcurrent-preventive device. Additionally, to prevent the increase of the inner pressure of the battery case, the sealing body, the hermetic sealing (gascket) or the battery case may be formed with a slit. Further, an external circuit for preventing overcharge or over-discharge of the battery may be provided.

The pellet or sheet electrode is preferably dried and demoisturized in advance in a usual manner. For example, hot air, vacuum, infrared radiation, far-infrared radiation, microwave and dried air may be used alone or in combination for the drying and demoisturization of the electrode. The temperature for the drying is preferably within a range between 50° C. and 380° C. A temperature of lower than 50° C. is not preferable because the moisture contained in the electrode cannot completely be removed. A temperature of higher than 380° C. is not preferable because the binder may be melted to deform the electrode.

As described above, the nonaqueous secondary battery of the present invention includes a positive electrode, a negative electrode and a nonaqueous ion conductor. Either one of the positive electrode and the negative electrode contains lithium or a lithium-absorbable and desorbable material as an active material thereof, and the other electrode contains a lithium transition-metal nitride of an anti-fluorite type structure as an active material thereof.

Since the lithium transition-metal nitride is used as the active material, the battery voltage can be reduced. Thus, the secondary battery exhibits a high energy efficiency as a power source for a low-voltage driven system.

Where the lithium transition-metal nitride is used as a negative-electrode active material, the absorption and desorption of lithium are permitted, and the discharge process comes first. That is, an active material into which lithium can first be inserted (typically, a chalcogen compound which does not initially contain lithium) can be used as a positive-electrode material. Therefore, the secondary battery is free from the generation of dendrite of lithium. Both the positive-electrode material and the negative-electrode material can repeat the charge-discharge process through a reaction of lithium absorption and desorption. Therefore, the secondary battery is substantially free from the decomposition of the electrolytic solution which may otherwise occur due to a lower voltage, and is safe.

The lithium transition-metal nitride represented by $Li_xMN_y$ (wherein M is Ti, V, Cr, Mn, Fe, Nb, Ta, Mo or W, $1<x<7.6$, and $2<y<4$) enables the secondary battery to supply a lower driving voltage.

Further, the lithium transition-metal nitride represented by $Li_xMnN_y$ ($5<x<7.6$) or by $Li_xFeN_2$ ($2.5<y<3.8$) enables the secondary battery to supply a lower driving voltage.

Where the lithium transition-metal nitride is used for the positive electrode and a lithium-absorbable and desorbable carbon or graphite material is used for the negative electrode, the secondary battery is free from the generation of dendrite of lithium. The positive-electrode active material and the negative-electrode active material exhibit excellent charge-discharge repetition characteristics through a reaction of lithium insertion and removal. Further, the secondary battery is substantially free from the decomposition of the electrolytic solution which may otherwise occur due to a lower voltage, and is safe.

EXAMPLES

The present invention will hereinafter be described in detail by way of examples thereof.

Example 1

Preparation of Active Material

Figure 3:
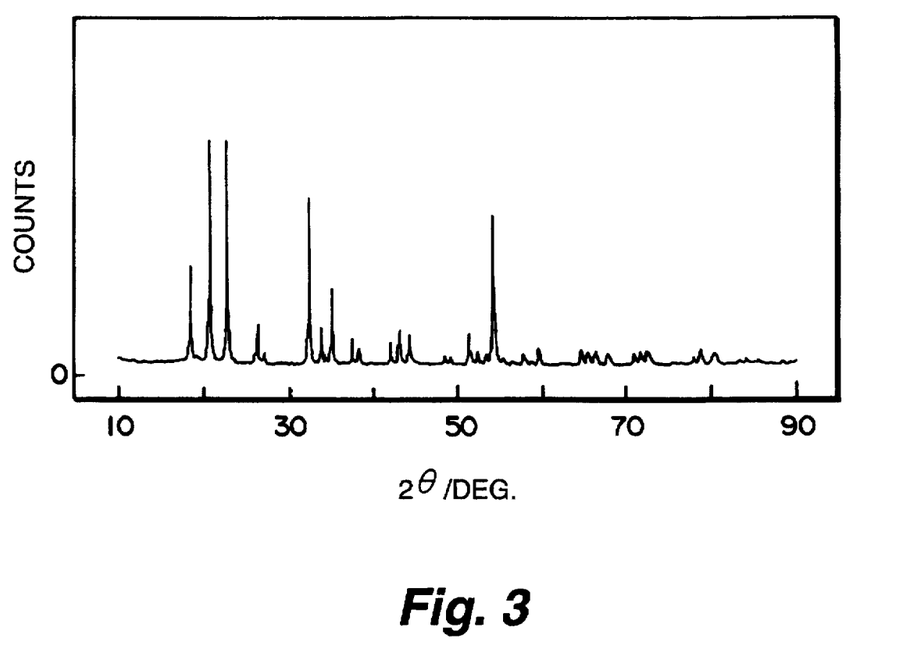
FIG. 3 is an X-ray diffraction pattern of $Li_7MnN_4$ used as an electrode active material in Example 1.

Lithium nitride ($Li_3N$) and manganese nitride ($Mn_4N$) were weighed in a ratio of Li:Mn=7.1:1 and mixed in a mortar. The mixture was press-molded into a pellet by applying thereto a pressure of 100 kg/cm². The pellet was calcinated at 600° C. for 10 hours in a nitrogen atmosphere containing 1% hydrogen. Thus, an active material $Li_7MnN_4$ was prepared. The active material was analyzed by the powder X-ray diffraction analysis using CuK α-ray as an X-ray source. The obtained X-ray diffraction pattern is shown in FIG. 3.

Preparation of Electrode

The active material thus prepared, acetylene black and polytetrafluoroethylene were mixed in a mortar in a ratio of 100:10:5. The mixture was press-molded into a pellet having a diameter of 20 mm and a weight of 0.25 g. At this time, a stainless steel (SUS304) mesh for use as a collector was embedded in the pellet. A stainless steel wire was spot-welded to the stainless steel mesh to establish a current collection line. Thus, a test electrode was prepared for evaluation thereof.

Evaluation of Electrode

The electrode was evaluated by way of a three-electrode method using lithium electrodes as a counter electrode and a reference electrode. Used as an electrolytic solution was propylene carbonate containing 1 mol/l lithium perchlorate. In the first charge-discharge cycle, the electrode was charged at a current density of 16.8 mA/g up to 1.6V, and then discharged at the same current density to 0.8V. The charge-discharge cycle was thereafter repeated in the same potential range and at the same current density.

As a result, the discharge capacity and average potential of the $Li_7MnN_4$ electrode were 170 mAh/g and 1.10V, respectively, in the first charge-discharge cycle, and 152 mAh/g and 1.03V, respectively, in the tenth charge-discharge cycle.

Examples 2 to 10 and Comparative Examples 1 to 4

Preparation of Active Materials

Lithium nitride ($Li_3N$) and metal manganese (Mn) powder were mixed in mortars in various Li/Mn ratios. The mixtures were each press-molded into a pellet by applying thereto a pressure of 100 kg/cm². The respective pellets were calcinated at 600° C. for 10 hours in a nitrogen atmosphere containing 1% hydrogen. Thus, active materials $Li_xMnN_4$ were prepared (in Examples 2 to 10, x=5.01, 5.48, 5.94, 6.45, 6.97, 7.11, 7.33, 7.42 and 7.57, respectively; and in Comparative Examples 1 to 4, x=4.21, 4.49, 7.68 and 7.74, respectively). The compositions of the respective active materials were determined by determining the ratio between lithium and manganese by way of the Inductively Coupled Plasma-Atomic Emission Spectroscopy (ICP-AES).

Preparation of Electrodes

Using the active materials thus prepared, test electrodes in a pellet form having a diameter of 20 mm and a weight of 0.25 g were prepared in the same manner as in Example 1.

Evaluation of Electrodes

The electrodes were evaluated under the same conditions as in Example 1. The results are shown in FIG. 4, in which the x value of $Li_xMnN_4$ versus the discharge capacity of the electrode in the first charge-discharge cycle were plotted for Examples 1 to 10 and Comparative Examples 1 to 4.

Figure 4:
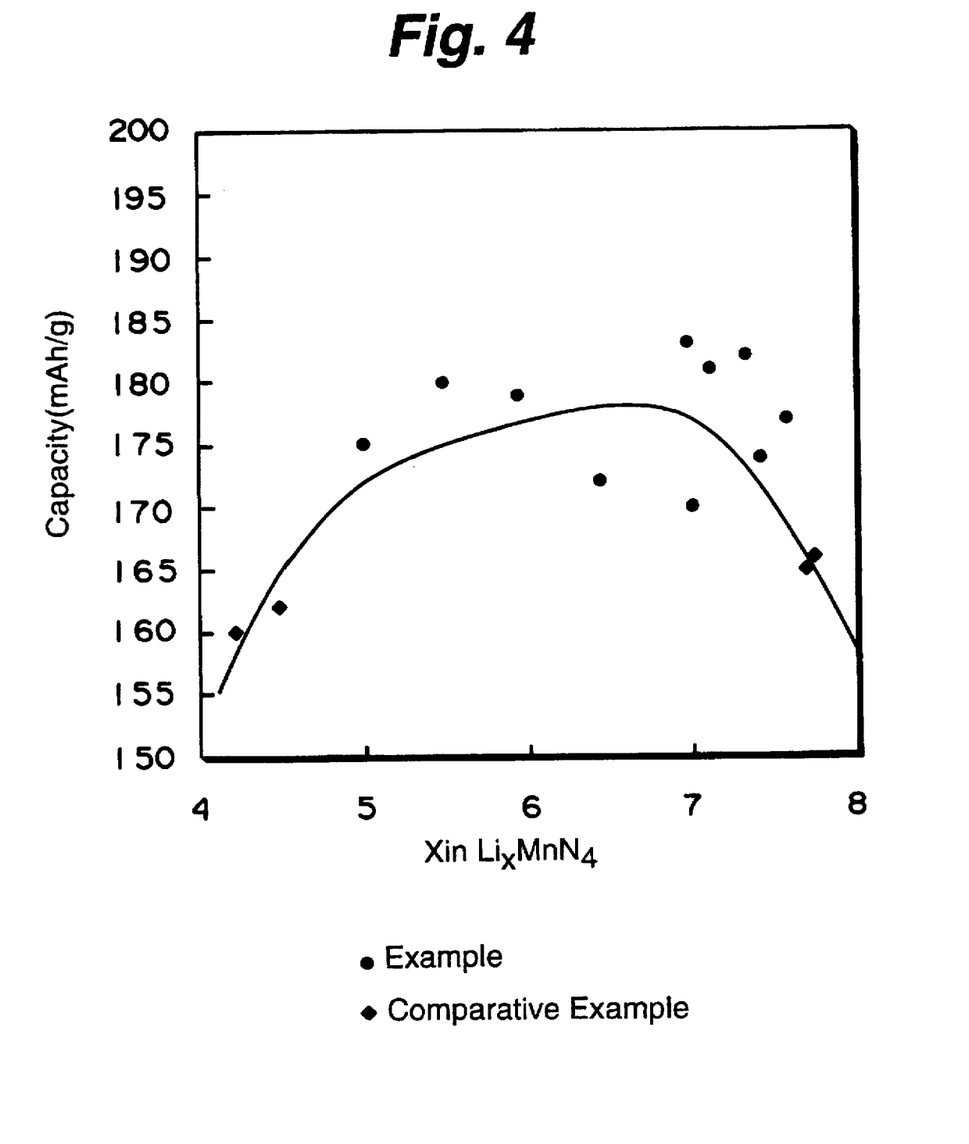
FIG. 4 is a graphical representation illustrating a relationship of initial discharge capacity versus x value of $Li_xMn\,N_4$ used as an electrode active material in Examples 1 to 10 and Comparative Examples 1 to 4.

FIG. 4 indicates that the active materials $Li_xMnN_4$ wherein $5<x<7.6$ are suitable for the electrode.

Example 11

Preparation of Active Material

Figure 5:
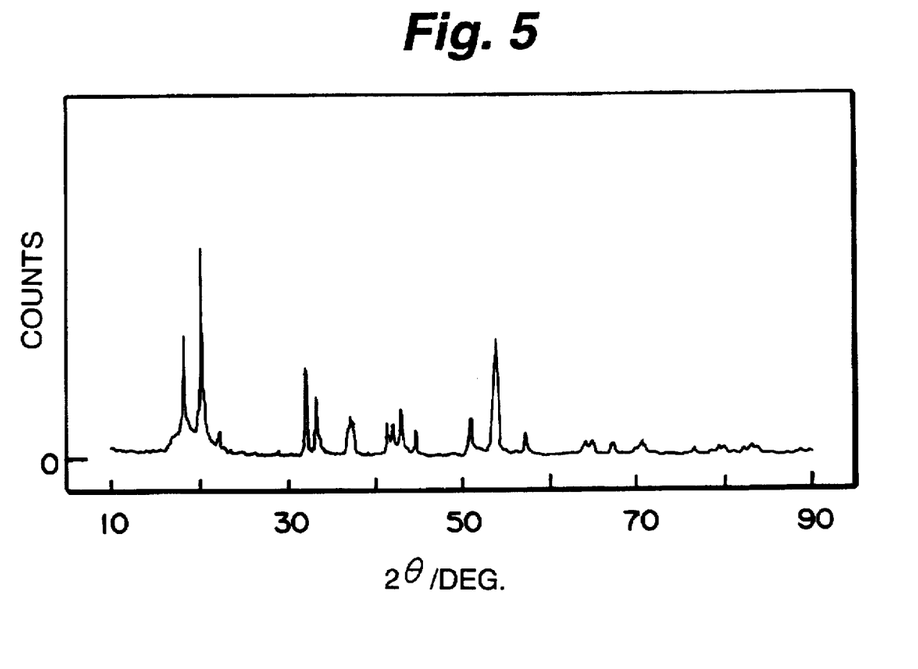
FIG. 5 is an X-ray diffraction pattern of $Li_3FeN_2$ used as an electrode active material in Example 11.

Lithium nitride ($Li_3N$) and iron nitride ($Fe_4N$) were weighed in a ratio of Li:Fe=3.1:1 and mixed in a mortar. The mixture was press-molded into a pellet by applying thereto a pressure of 100 kg/cm². The pellet was calcinated at 600° C. for 10 hours in a nitrogen atmosphere containing 1% hydrogen. Thus, an active material $Li_3FeN_2$ was prepared. The active material was analyzed by the powder X-ray diffraction analysis using CuK α-ray as an X-ray source. The obtained Xray diffraction pattern is shown in FIG. 5.

Preparation of Electrode

A test electrode in a pellet form having a diameter of 20 mm and a weight of 0.25 g was prepared in substantially the same manner as in Example 1, except that the active material thus prepared, acetylene black and polytetrafluoroethylene were mixed in a ratio of 100:20:15.

Evaluation of Electrode

The electrode was evaluated by way of a three-electrode method using lithium electrodes as a counter electrode and a reference electrode. Used as an electrolytic solution is a solution in which 0.5 mol/l lithium trifluoromethane sulfonate was dissolved in a solvent mixture containing γ-butyrolactone and dimethoxyethane in a ratio of 1:1. In the first chargedischarge cycle, the electrode was charged at a current density of 25.6 mA/g up to 1.5V, and then discharged at the same current density to 0.7V. The charge-discharge cycle was thereafter repeated in the same potential range and at the same current density.

As a result, the discharge capacity and average potential of the $Li_3FeN_2$ electrode were 175 mAh/g and 1.2V, respectively, in the first charge-discharge cycle, and 146 mAh/g and 1.2V, respectively, in the tenth charge-discharge cycle.

Examples 12 to 18 and Comparative Examples 5 to 9

Preparation of Active Materials

Lithium nitride ($Li_3N$) and metal iron (Fe) powder were mixed in mortars in various Li/Fe ratios. The mixtures were each press-molded into a pellet by applying thereto a pressure of 100 kg/cm². The respective pellets were calcinated at 600° C. for 10 hours in a nitrogen atmosphere containing 1% hydrogen. Thus, active materials $Li_xFeN_2$ were prepared (in Examples 12 to 18, x=2.52, 2.74, 3.22, 3.46, 3.57, 3.67 and 3.78, respectively; and in Comparative Examples 5 to 9, x=1.82, 1.94, 2.03, 2.24 and 3.98, respectively). The compositions of the respective active materials were determined by determining the ratio between lithium and ion by way of the Inductively Coupled Plasma-Atomic Emission Spectroscopy (ICP-AES).

Preparation of Electrodes

Using the active materials thus prepared, test electrodes in a pellet form having a diameter of 20 mm and a weight of 0.25 g were prepared in the same manner as in Example 1.

Evaluation of Electrodes

The electrodes were evaluated under substantially the same conditions as in Example 11, except that a solution in which 1 mol/l lithium perchlorate was dissolved in a solvent mixture containing propylene carbonate and ethylmethyl carbonate in a ratio of 1:1. The results are shown in FIG. 6, in which the x value of $Li_xFeN_2$ versus the discharge capacity of the electrode in the first charge-discharge cycle were plotted for Examples 11 to 18 and Comparative Examples 5 to 9.

Figure 6:
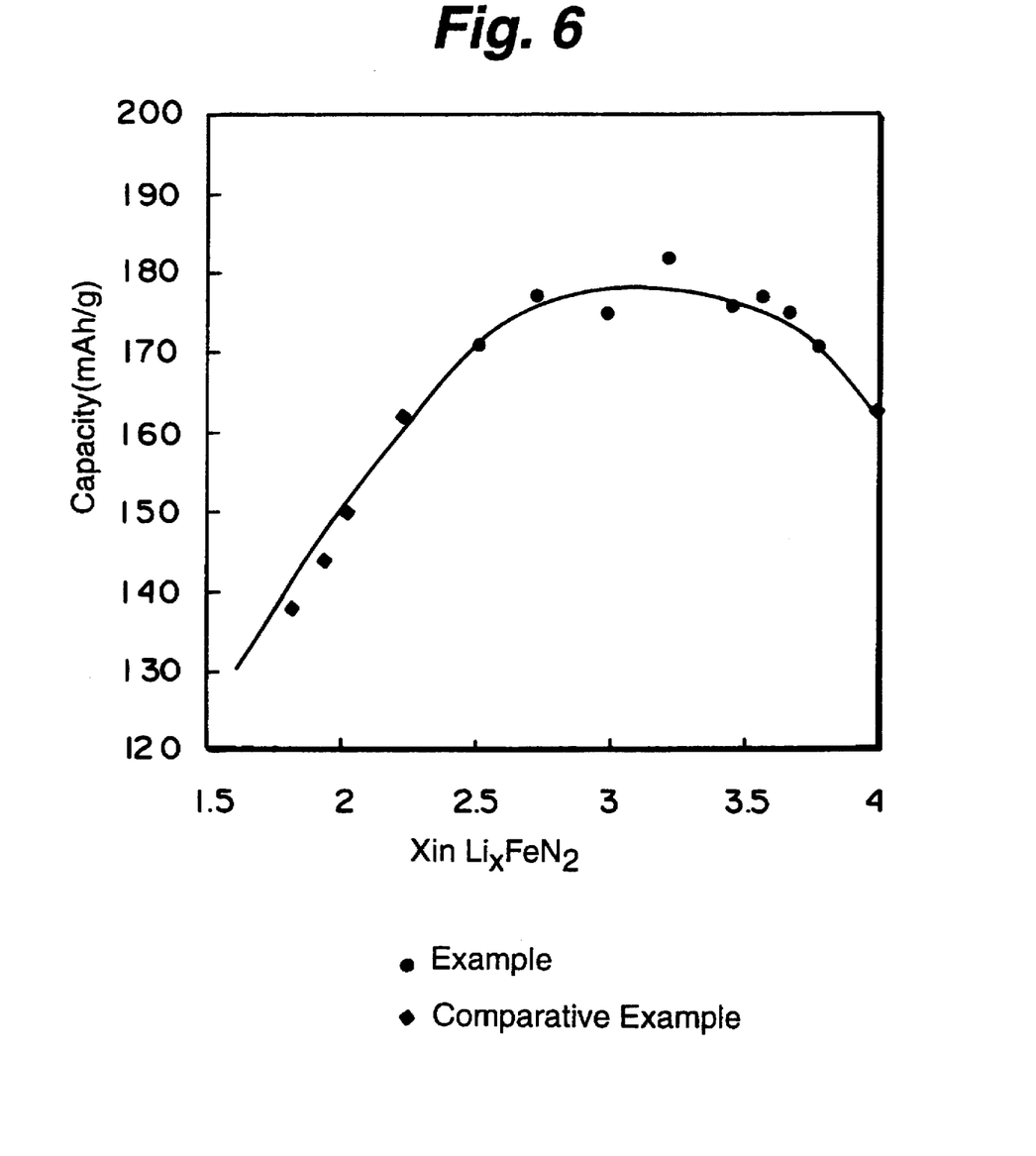
FIG. 6 is a graphical representation illustrating a relationship of initial discharge capacity versus x value of $Li_xFeN_2$ used as an electrode active material in Examples 11 to 18 and Comparative Examples 5 to 9.

FIG. 6 indicates that the active materials $Li_xFeN_2$ wherein $2.5<x<3.8$ are suitable for the electrode.

Example 19

Preparation of Positive-Electrode Active Material and Positive Electrode

A positive-electrode active material $Li_7MnN_4$ and a positive electrode in a pellet form having a diameter of 15 mm and a weight of 50 mg were prepared in the same manner as in Example 1.

Preparation of Negative Electrode

A pyrolyzed carbon material was employed for a negative electrode. A starting material of propane was decomposed at 750° C. for two hours under a normal pressure through gas-phase pyrolysis, and the resulting carbon was deposited on a nickel collector (surface area: 4 cm²) for the preparation of the electrode. According to the X-ray diffraction analysis, the carbon material thus obtained was such that the interfacial distance $d_{002}$ between (002) planes was 0.337 nm and the crystallite thickness Lc in a (002) plane direction was 15 nm. According to the argon laser Raman spectroscopy, the carbon material was such that the ratio (R value) of a peak intensity around 1360 cm$^{-1}$ to that around 1580 cm$^{-1}$ was 0.46. A nickel wire was spot-welded to the electrode to establish a current collection line. The electrode was dried at 200° C. under a reduced pressure to be used as the negative electrode. The weight of the active material in the negative electrode was 23 mg.

Evaluation of Battery

A battery was fabricated by using a beaker type cell, the positive and negative electrodes thus prepared and an electrolytic solution in which 1 mol/l lithium perchlorate was dissolved in a solvent mixture containing propylene carbonate and diethyl carbonate in a ratio of 1:1. The battery thus fabricated was evaluated in the following manner. In a charge-discharge test, the battery was first charged at a current of 0.2 mA up to 1.7V and then discharged at the same current to 0.5V in the first charge-discharge cycle. The charge-discharge process was thereafter repeated in the same voltage range and at the same current.

As a result, the discharge capacity and average voltage of the battery were 5.5 mAh and 0.9V, respectively, in the first charge-discharge cycle, and 4.8 mAh and 0.88V, respectively, in the tenth charge-discharge cycle.

Example 20

Preparation of Positive-Electrode Active Material and Positive Electrode

A positive-electrode active material $Li_3FeN_2$ was prepared in the same manner as in Example 11, and a positive electrode in a pellet form having a diameter of 15 mm and a thickness of 0.77 mm was prepared in the same manner as in Example 1. The weight of the active material in the positive electrode was 200 mg.

Preparation of Negative Electrode

Natural graphite (produced in Madagascar, flaky shape, particle diameter: 11 μm, $d_{002}$: 0.337 nm, Lc: 27 nm, La (the crystallite thickness in an a-axis direction): 17 nm, R value: 0, surface area: 8 m²/g) was employed as a negative-electrode active material. The natural graphite and polytetrafluoroethylene were mixed in a ratio of 10:1, and the mixture was press-molded into a pellet having a diameter of 15 mm and a thickness of 0.57 mm for the preparation of a negative electrode. The weight of the active material in the pellet was 90 mg. At the press-molding, a nickel mesh collector was embedded in the pellet. The pellet was dried at 200° C. under a reduced pressure for removal of moisture therefrom. Thus, the negative electrode was prepared.

Fabrication of Battery

Figure 7:
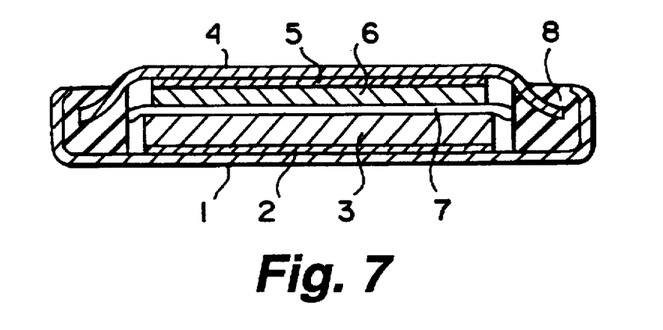
FIG. 7 is a schematic sectional view illustrating a coin-type battery used in Examples.

A coin-type battery as shown in FIG. 7 was fabricated in the following manner. The positive electrode 3 including the positive-electrode collector 2 was press-fitted in a positive-electrode case 1 including an insulation packing 8 fitted therein. A separator 7 of a polypropylene nonwoven fabric was placed on the positive electrode 3, and impregnated with an electrolytic solution in which 1 mol/l electrolytic salt $LiPF_6$ was dissolved in a solvent mixture containing ethylene carbonate, propylene carbonate and diethyl carbonate in a volume ratio of 2:1:3. The negative electrode 6 including a negative-electrode collector 5 and fitted in a negativeelectrode case 4 was placed on the separator 7. In turn, the positive-electrode case 1 was pressedly secured to the negative-electrode case 4 with the insulation packing 8 interposed therebetween for sealing. Thus, the coin-type battery was fabricated.

Evaluation of Battery

The battery thus fabricated was evaluated by measuring the discharge capacity thereof. The battery was charged at a charge current of 1 mA up to an upper-limit charge voltage of 1.6V and discharged at a discharge current of 1 mA to a lowerlimit voltage of 0.6V in the first charge-discharge cycle. The charge-discharge process was thereafter repeated in the same voltage range and at the same current density for the evaluation of the battery.

As a result, the average voltage and discharge capacity of the battery were 0.9V and 22 mAh, respectively, in the first charge-discharge cycle, and 0.9V and 19 mAh, respectively, in the tenth charge-discharge cycle.

Example 21

Preparation of Negative-Electrode Active Material and Negative Eectrode

A negative-electrode active material $Li_3FeN_2$ and a negative electrode in a pellet form having a diameter of 15 mm and a weight of 50 mg were prepared in the same manner as in Example 1.

Preparation of Positive Electrode

A positive-electrode active material $V_2O_5$, acetylene black and polyvinylidene fluoride were mixed in a ratio of 100:10:10, and N-methylpyrrolidone was added to the mixture to obtain a paste. The paste was applied on an aluminum foil collector, and dried at 100° C. and further at 200° C. in vacuum. The dried paste was press-molded by applying thereto a pressure of 100 Kg/cm² to prepare a positive electrode having an area of 4 cm² and a weight of 70 mg. An aluminum wire was spot-welded to the electrode to establish a current collection line.

Evaluation of Battery

A battery was fabricated by using a beaker type cell, the positive and negative electrodes thus prepared and an electrolytic solution in which 1 mol/l lithium perchlorate was dissolved in a solvent mixture containing propylene carbonate and diethyl carbonate in a ratio of 2:1. The battery thus fabricated was evaluated in the following manner. In a charge-discharge test, the battery was first discharged at a current of 0.2 mA to 1.7V and then charged at the same current up to 3.0V in the first discharge-charge cycle. The discharge-charge process was thereafter repeated in the same voltage range and at the same current density.

As a result, the discharge capacity and average voltage of the battery were 5.2 mAh and 2.03V, respectively, in the first discharge-charge cycle, and 4.5 mAh and 1.98V, respectively, in the tenth discharge-charge cycle.

Example 22

Preparation of Negative-Electrode Active Material and Negative Electrode

A negative-electrode active material $Li_7MnN_4$ and a negative electrode in a pellet form having a diameter of 15 mm and a thickness of 0.6 mm were prepared in the same manner as in Example 1. The weight of the active material in the pellet was 0.16 g.

Preparation of Positive Electrode

Lithium hydroxide and manganese dioxide (I.C.No.12) were mixed in a ratio of Li:Mn=3:10, and the mixture was heat-treated at 400° C. in air for 48 hours to prepare a positive-electrode active material of lithium-containing manganese dioxide. The positive-electrode active material thus prepared, acetylene black and polytetrafluoroethylene were mixed in a mortar in a ratio of 100:10:10, and the mixture was press-molded into a pellet having a diameter of 15 mm and a thickness of 0.74 mm by applying thereto a pressure of 100 Kg/cm$^2$. The weight of the active material in the pellet was 0.20 g. At the press-molding, a titanium mesh collector was embedded in the pellet. The pellet was dried at 200° C. under a reduced pressure for removal of moisture therefrom. Thus, a positive electrode was prepared.

Evaluation of Battery

A coin-type battery was fabricated in the same manner as in Example 20.

The coin-type battery thus fabricated was first discharged at a current of 1 mA to a discharge limit voltage of 0.9V and then charged at the same current up to 3.2V in the first discharge-charge cycle. The discharge-charge process was thereafter repeated in the same potential range and at the same current density for the evaluation of the battery.

As a result, the discharge capacity and average potential of the battery were 19 mAh and 1.45V, respectively, in the first discharge-charge cycle, 16 mAh and 1.41V, respectively, in the tenth discharge-charge cycle, and 14 mAh and 1.39V, respectively, in the 100th discharge-charge cycle. As can be understood from the foregoing, the battery was excellent in the cycle characteristic and free from the decomposition of the electrolytic solution.

Examples 23 to 31 and Comparative Examples 10 to 13

Preparation of Negative-Electrode Active Materials and Negative Electrodes

Negative-electrode active materials Li$_x$MnN$_4$ (in Examples 23 to 31, x=5.01, 5.48, 5.94, 6.45, 6.97, 7.11, 7.33, 7.42 and 7.57, respectively; and in Comparative Examples 10 to 13, x=4.21, 4.49, 7.68 and 7.74, respectively) and negative electrodes in a pellet form having a diameter of 15 mm and a thickness of 0.6 mm were prepared in the same manner as in Examples 2 to 10 and Comparative Examples 1 to 4, respectively. The weight of the active material in each pellet was 0.16 g.

Preparation of Positive Electrodes

Positive electrodes were prepared in the same manner as in Example 22.

Preparation of Batteries

Coin-type batteries were fabricated and evaluated in the same manner as in Example 22.

Figure 8:
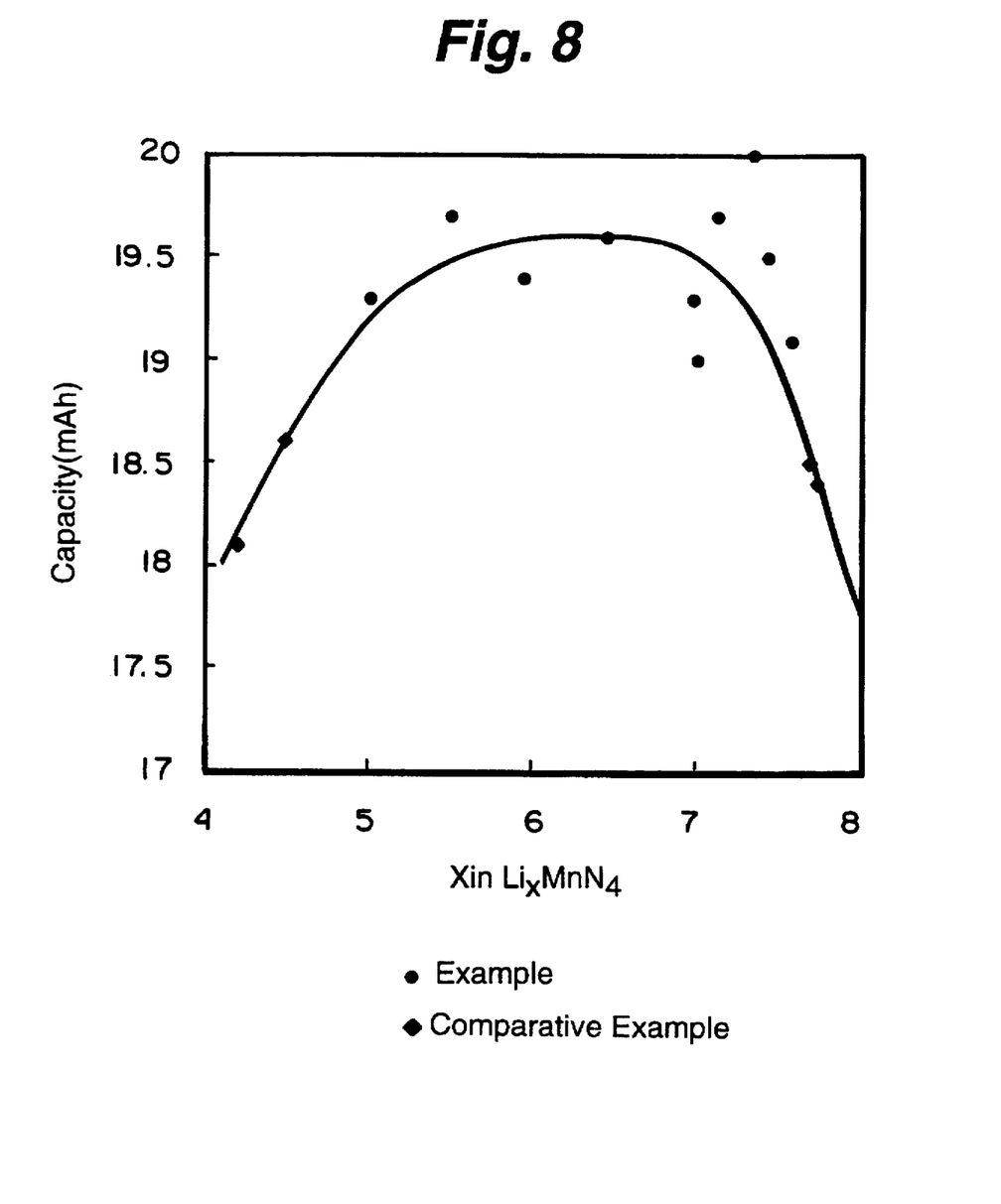
FIG. 8 is a graphical representation illustrating a relationship of initial discharge capacity versus x value of $Li_xMnN_4$ used as an electrode active material in a coin-type battery in Examples 22 to 31 and Comparative Examples 10 to 13.

The results are shown in FIG. 8, in which the x value of Li$_x$MnN$_4$ versus the discharge capacity of the electrode in the first discharge-charge cycle were plotted for Examples 22 to 31 and Comparative Examples 10 to 13.

FIG. 8 indicates that the active materials Li$_x$MnN$_4$ wherein 5<x<7.6 are suitable for the negative electrode.

Example 32

Preparation of Negative-Electrode Active Material and Negative Electrode

A negative-electrode active material Li$_7$MnN$_4$ and a negative electrode in a pellet form having a diameter of 15 mm and a thickness of 0.60 mm were prepared in substantially the same manner as in Example 1, except that the active material, acetylene black and polytetrafluoroethylene were mixed in a weight ratio of 100:5:5. The weight of the active material in the pellet was 0.16 g.

Preparation of Positive Electrode Lithium hydroxide and manganese dioxide (I.C.No.12) were mixed in a ratio of Li:Mn=1:10, and the mixture was heat-treated at 450° C. in air for 48 hours to prepare a positive-electrode active material of lithium-containing manganese dioxide. The positive-electrode active material thus prepared, acetylene black and polytetrafluoroethylene were mixed in a mortar in a ratio of 100:10:10, and the mixture was press-molded into a pellet having a diameter of 15 mm and a thickness of 0.74 mm by applying thereto a pressure of 100 Kg/cm$^2$. The weight of the active material in the pellet was 0.20 g. At the press-molding, a titanium mesh collector was embedded in the pellet. The pellet was dried at 100° C. under a reduced pressure for removal of moisture therefrom. Thus, a positive electrode was prepared.

Evaluation of Battery

A coin-type battery was fabricated in substantially the same manner as in Example 20, except that a solution in which 1 mol/l lithium perchlorate was dissolved in a solvent mixture containing propylene carbonate and ethylmethyl carbonate in a ratio of 1:1 was used as an electrolytic solution. The cointype battery thus fabricated was first discharged at a current of 1 mA to a discharge limit voltage of 0.9V and then charged at the same current up to 3.2V in the first discharge-charge cycle. The discharge-charge process was thereafter repeated in the same potential range and at the same current density for the evaluation of the battery.

As a result, the discharge capacity and average potential of the battery were 19 mAh and 1.48V, respectively, in the first discharge-charge cycle, 17 mAh and 1.44V, respectively, in the tenth discharge-charge cycle, and 15 mAh and 1.41V, respectively, in the 100th discharge-charge cycle. As can be understood from the foregoing, the battery was excellent in the cycle characteristic and free from the decomposition of the electrolytic solution.

Example 33

Preparation of Negative-Electrode Active Material and Negative Electrode

A negative-electrode active material Li$_7$MnN$_4$ and a negative electrode in a pellet form having a diameter of 15 mm and a thickness of 0.82 mm were prepared in substantially the same manner as in Example 1, except that the active material, acetylene black and polytetrafluoroethylene were mixed in a weight ratio of 100:40:28. The weight of the active material in the pellet was 0.12 g.

Preparation of Positive Electrode

Lithium hydroxide and manganese dioxide (I.C.No.12) were mixed in a ratio of Li:Mn=1.1:2, and the mixture was heattreated at 700° C. in air for 20 hours to prepare a positive-electrode active material of lithium-containing manganese dioxide (spinel-type lithium manganese oxide LiMn$_2$O$_4$). The positive-electrode active material thus prepared, acetylene black and polytetrafluoroethylene were mixed in a mortar in a ratio of 100:10:10, and the mixture was press-molded into a pellet having a diameter of 15 mm and a thickness of 0.55 mm by applying thereto a pressure of 100 Kg/cm$^2$. The weight of the active material in the pellet was 0.15 g. At the pressmolding, a titanium mesh collector was embedded in the pellet. The pellet was dried at 100° C. under a reduced pressure for removal of moisture therefrom. Thus, a positive electrode was prepared.

Evaluation of Battery

A coin-type battery was fabricated in substantially the same manner as in Example 20, except that a solution in which 1 mol/l lithium perchlorate was dissolved in a solvent mixture containing propylene carbonate and ethylmethyl carbonate in a ratio of 1:1 was used as an electrolytic solution. The coin-type battery thus fabricated was first discharged at a current of 1 mA to a discharge limit voltage of 0.9V and then charged at the same current up to 3.2V in the first discharge-charge cycle. The discharge-charge process was thereafter repeated in the same potential range and at the same current for the evaluation of the battery.

As a result, the discharge capacity and average potential of the battery were 16 mAh and 1.55V, respectively, in the first discharge-charge cycle, 14 mAh and 1.47V, respectively, in the tenth discharge-charge cycle, and 13 mAh and 1.45V, respectively, in the 100th discharge-charge cycle. As can be understood from the foregoing, the battery was excellent in the cycle characteristic and free from the decomposition of the electrolytic solution.

Example 34

Preparation of Negative-Electrode Active Material and Negative Electrode

A negative-electrode active material $Li_7MnN_4$ and a negative electrode in a pellet form having a diameter of 15 mm and a thickness of 0.67 mm were prepared in substantially the same manner as in Example 1, except that the active material, acetylene black and polytetrafluoroethylene were mixed in a weight ratio of 100:2:2. The weight of the active material in the pellet was 0.18 g.

Preparation of Positive Electrode

A positive-electrode active material of titanium disulfide ($TiS_2$), acetylene black and polytetrafluoroethylene were mixed in a mortar in a ratio of 100:3:4, and the mixture was press-molded into a pellet having a diameter of 15 mm and a thickness of 0.67 mm by applying thereto a pressure of 100 $Kg/cm^2$. The weight of the active material in the pellet was 0.18 g. At the press-molding, a titanium mesh collector was embedded in the pellet. The pellet was dried at 100° C. under a reduced pressure for removal of moisture therefrom. Thus, a positive electrode was prepared.

Evaluation of Battery

A coin-type battery was fabricated in substantially the same manner as in Example 20, except that propylene carbonate containing 1 mol/l lithium perchlorate dissolved therein was used as an electrolytic solution.

The coin-type battery thus fabricated was first discharged at a current of 1 mA to a discharge limit voltage of 0.5V and then charged at the same current up to 3.5V in the first discharge-charge cycle. The discharge-charge process was thereafter repeated in the same potential range and at the same current for the evaluation of the battery.

As a result, the discharge capacity and average potential of the battery were 20 mAh and 0.82V, respectively, in the first discharge-charge cycle, 18 mAh and 0.80V, respectively, in the tenth discharge-charge cycle, and 16 mAh and 0.78V, respectively, in the 100th discharge-charge cycle. As can be understood from the foregoing, the battery was excellent in the cycle characteristic and free from the decomposition of the electrolytic solution.

Example 35

Preparation of Negative-Electrode Active Material and Negative Electrode

A negative-electrode active material $Li_7MnN_4$ and a negative electrode in a pellet form having a diameter of 15 mm and a thickness of 0.57 mm were prepared in substantially the same manner as in Example 1, except that the active material, acetylene black and polytetrafluoroethylene were mixed in a weight ratio of 100:5:5. The weight of the active material in the pellet was 0.15 g.

Preparation of Positive Electrode

A positive-electrode active material of vanadium oxide ($V_6O_{13}$), acetylene black and polytetrafluoroethylene were mixed in a mortar in a ratio of 100:35:28, and the mixture was press-molded into a pellet having a diameter of 15 mm and a thickness of 0.80 mm by applying thereto a pressure of 100 $Kg/cm^2$. The weight of the active material in the pellet was 0.11 g. At the press-molding, a titanium mesh collector was embedded in the pellet. The pellet was dried at 100° C. under a reduced pressure for removal of moisture therefrom. Thus, a positive electrode was prepared.

Evaluation of Battery

A coin-type battery was fabricated in the same manner as in Example 20.

The coin-type battery thus fabricated was first discharged at a current of 1 mA to a discharge limit voltage of 0.5V and then charged at the same current up to 3.5V in the first discharge-charge cycle. The discharge-charge process was thereafter repeated in the same potential range and at the same current for the evaluation of the battery.

As a result, the discharge capacity and average potential of the battery were 20 mAh and 1.02V, respectively, in the first discharge-charge cycle, 18 mAh and 0.98V, respectively, in the tenth discharge-charge cycle, and 17 mAh and 0.95V, respectively, in the 100th discharge-charge cycle. As can be understood from the foregoing, the battery was excellent in the cycle characteristic and free from the decomposition of the electrolytic solution.

Examples 36 to 43 and Comparative Examples 14 to 18

Preparation of Negative-Electrode Active Materials and Negative Electrodes

Negative-electrode active materials $Li_xFeN_2$ (in Examples 36 to 42, x=2.52, 2.74, 3.22, 3.46, 3.57, 3.67 and 3.78, respectively; and in Comparative Examples 14 to 18, x=1.82, 1.94, 2.03, 2.24 and 3.98, respectively) and negative electrodes in a pellet form having a diameter of 15 mm and a thickness of 0.6 mm were prepared in the same manner as in Examples 12 to 18 and Comparative Examples 5 to 9, respectively. The weight of the active material in each pellet was 0.16 g. In Example 43, an active material $Li_3FeN_2$ and a negative electrode in a pellet form having a diameter of 15 mm and a thickness of 0.6 mm were prepared in the same manner as in Example 11. The weight of the active material in the pellet was 0.16 g.

Preparation of Positive Electrodes

Positive electrodes were prepared in the same manner as in Example 22.

Evaluation of Batteries

Coin-type batteries were fabricated and evaluated in the same manner as in Example 22.

Figure 9:
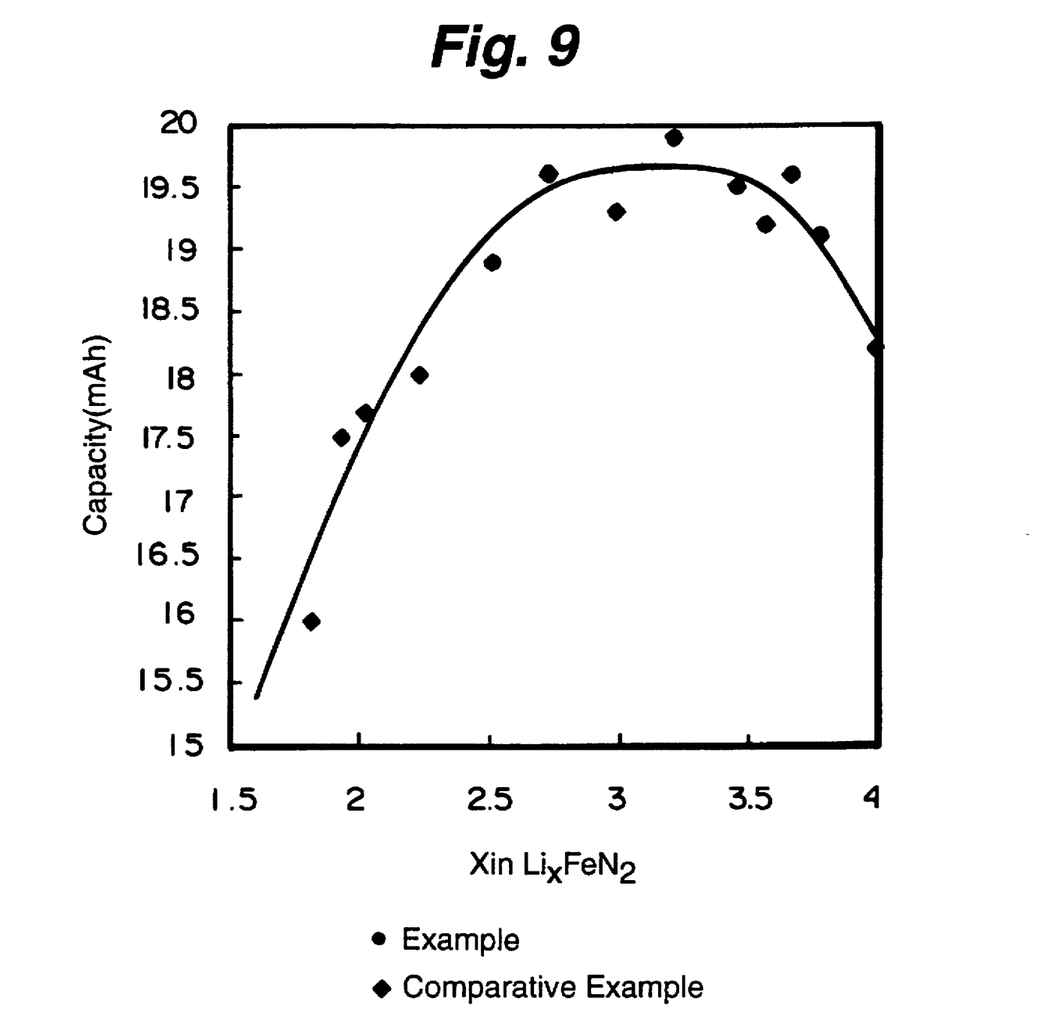
FIG. 9 is a graphical representation illustrating a relationship of initial discharge capacity versus x value of $Li_xMnN_4$ used as an electrode active material in a coin-type battery in Examples 36 to 43 and Comparative Examples 14 to 18.

The results are shown in FIG. 9, in which the x value of $Li_xMnN_4$ versus the discharge capacity of the electrode in the first discharge-charge cycle were plotted for Examples 36 to 43 and Comparative Examples 14 to 18.

FIG. 9 indicates that the negative-electrode active materials $Li_xMnN_4$ wherein 2.5<x<3.8 are suitable for the negative electrode.

Comparative Example 19

Preparation of Negative Electrode

A negative-electrode active material of natural graphite produced in Madagascar and polytetrafluoroethylene were mixed in a ratio of 10:1, and the mixture was press-molded into a pellet having a diameter of 15 mm and a thickness of 0.54 mm. The weight of the active material in the pellet was 80 mg. At the press-molding, a nickel mesh collector was embedded in the pellet. The pellet was dried at 200° C. under a reduced pressure for removal of moisture therefrom. Thus, a negative electrode was prepared.

Preparation of Positive Electrode

A positive-electrode active material of $LiCoO_2$, acetylene black and polytetrafluoroethylene were mixed in a mortar in a ratio of 100:10:10, and the mixture was press-molded into a pellet having a diameter of 15 mm and a thickness of 0.8 mm by applying a pressure of 100 Kg/cm$^2$. The weight of the active material in the pellet was 0.22 g. At the press-molding, a titanium mesh collector was embedded in the pellet. The pellet was dried at 200° C. under a reduced pressure for removal of moisture therefrom. Thus, a positive electrode was prepared.

Evaluation of Battery

A coin-type battery was fabricated in the same manner as in Example 20.

The coin-type battery thus fabricated was first charged at a current of 1 mA up to a charge limit voltage of 4.5V and then discharged at the same current to 2.7V in the first charge-discharge cycle. The charge-discharge process was thereafter repeated in the same potential range and at the same current for the evaluation of the battery.

As a result, the discharge capacity and average potential of the battery were 20 mAh and 3.74V, respectively, in the first charge-discharge cycle, 15 mAh and 3.68V, respectively, in the tenth charge-discharge cycle, and 9 mAh and 3.55V, respectively, in the 100th discharge-charge cycle. The deterioration of the cycle characteristic was due to the decomposition of the electrolytic solution.

Comparative Example 20

Preparation of Negative Electrode

A negative-electrode active material $Li_7MnN_4$ and a negative electrode in a pellet form having a diameter of 15 mm and a thickness of 0.82 mm were prepared in the same manner as in Example 22. The weight of the active material in the pellet was 0.12 g.

Preparation of Positive Electrode

A positive-electrode active material $LiCoO_2$ and a positive electrode in a pellet form having a diameter of 15 mm and a thickness of 0.74 mm were prepared in the same manner as in Comparative Example 19. The weight of the active material in the pellet was 0.20 g.

Evaluation of Battery

A coin-type battery was prepared in the same manner as in Example 20.

The coin-type battery was discharged at a current of 1 mA to 1.0V. At this time, the discharge capacity of the battery was 1 mAh.

As described above, the nonaqueous secondary battery of the present invention includes a positive electrode, a negative electrode and a nonaqueous ion conductor. Either one of the positive electrode and the negative electrode contains lithium or a lithium-absorbable and desorbable substance as an active material thereof, and the other electrode contains a lithium transition-metal nitride of an anti-fluorite structure as an active material thereof.

The battery voltage of the secondary battery can be reduced by employing the lithium transition-metal nitride, for example, as the negative-electrode active material. Further, such an active material as manganese dioxide, vanadium pentoxide, titanium sulfide or molybdenum sulfide which is initially in a charged state can be used as the positive-electrode active material. Thus, the battery voltage can be variously controlled by selecting a positive-electrode active material to be used in combination with the lithium transition-metal nitride.

Further, the battery voltage of the secondary battery can be variously controlled by employing a carbon or graphite material or a lithium alloy as the negative-electrode active material and the lithium transition-metal nitride as the positive-electrode active material in combination.

The secondary battery can repeat the charge-discharge process through a lithium-insertion and desertion reaction in the positive- and negative-electrode active materials. In addition, the secondary battery is substantially free from the decomposition of the electrolytic solution which may otherwise occur due to a lower voltage, and is safe. This makes it possible to variously control the battery voltage, discharge and charge characteristics and cycle characteristics of the secondary battery, thereby increasing the design flexibility of a battery. Thus, the secondary battery of the present invention can be used in a variety of small-size portable electronic systems.

The lithium transition-metal nitride represented by $Li_xMN_y$ (wherein M is Ti, V, Cr, Mn, Fe, Nb, Ta, Mo or W, $1 \leq x \leq 7.6$, and $2 \leq y \leq 4$) enables the secondary battery to supply a lower driving voltage.

The lithium transition-metal nitride represented by $Li_xMnN_y$ ($5 \leq x \leq 7.6$) or by $Li_xFeN_2$ ($2.5 \leq y \leq 3.8$) enables the secondary battery to supply a further lower driving voltage.

The lithium-absorbable and desorbable active material comprising a carbon or graphite material makes the secondary battery highly safe.

What is claimed is:

1. A nonaqueous secondary battery comprising a positive electrode, a negative electrode and a nonaqueous ion conductor, either the positive electrode or the negative electrode containing lithium or a lithium absorbable and desorbable substance as an active material thereof and the other electrode contains as the active material a lithium transition-metal nitride of an anti-fluorite structure represented by $Li_xMnN_4$ wherein $5 \leq x \leq 7.6$ or by $Li_xFeN_2$ wherein $2.5 \leq x \leq 3.8$.

2. A nonaqueous secondary battery as set forth in claim 1, wherein the negative electrode contains carbon or graphite as the active material and the positive electrode contains said lithium transition-metal nitride.

3. A nonaqueous secondary battery comprising a positive electrode, a negative electrode and a nonaqueous ion conductor, the negative electrode containing a lithium transition-metal nitride of an anti-fluorite structure as the active material and the positive electrode contains as the active material a chalcogen compound or a transition-metal oxide which is initially subjected to a discharge process.

4. A nonaqueous secondary battery as set forth in claim 3, wherein the transition-metal oxide is selected from the group consisting of $MnO_2$, $V_2O_5$, $V_6O_{13}$, $TiO_2$, $WO_3$, $MoO_3$, $Nb_2O_5$, $VO_2$, $CrO_2$, $Cr_3O_8$, $TiS_2$, $MoS_2$ and $MoS_3$.

5. A nonaqueous secondary battery as set forth in claim 3, wherein the lithium transition-metal nitride is represented by $Li_xMN_y$, wherein M is Ti, V, Cr, Mn, Fe, Nb, Ta, Mo or W, $1 \leq x \leq 7.6$ and $2 \leq y \leq 4$.

6. A nonaqueous secondary battery comprising a positive electrode, a negative electrode and a nonaqueous ion conductor, the negative electrode containing as an active material a lithium transition-metal nitride of an anti-fluorite structure, the positive electrode containing as an active material a lithium-containing manganese dioxide having a composition ratio Li/Mn of not greater than ½.

7. A nonaqueous secondary battery as set forth in claim 6, wherein the lithium transition-metal nitride is represented by $Li_xMN_y$, wherein M is Ti, V, Cr, Mn, Fe, Nb, Ta, Mo or W, $1 \leq x \leq 7.6$ and $2 \leq x \leq 4$.

8. A nonaqueous secondary battery as set forth in claim 6, wherein the lithium transition-metal nitride is represented by $Li_xMnN_4$ wherein $5 \leq x \leq 7.6$ or by $Li_xFeN_2$ wherein $2.5 \leq x \leq 3.8$.

* * * * *